C. HALPERN.
SAFETY APPLIANCE FOR VEHICLES.
APPLICATION FILED OCT. 20, 1920.

1,401,774.

Patented Dec. 27, 1921.
3 SHEETS—SHEET 1.

Inventor:
Carl Halpern,
By his Attorney,

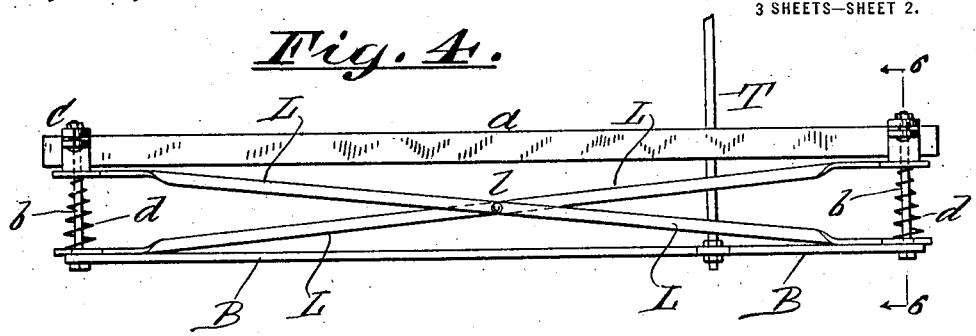
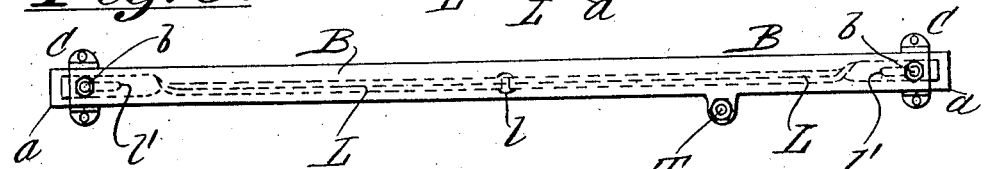
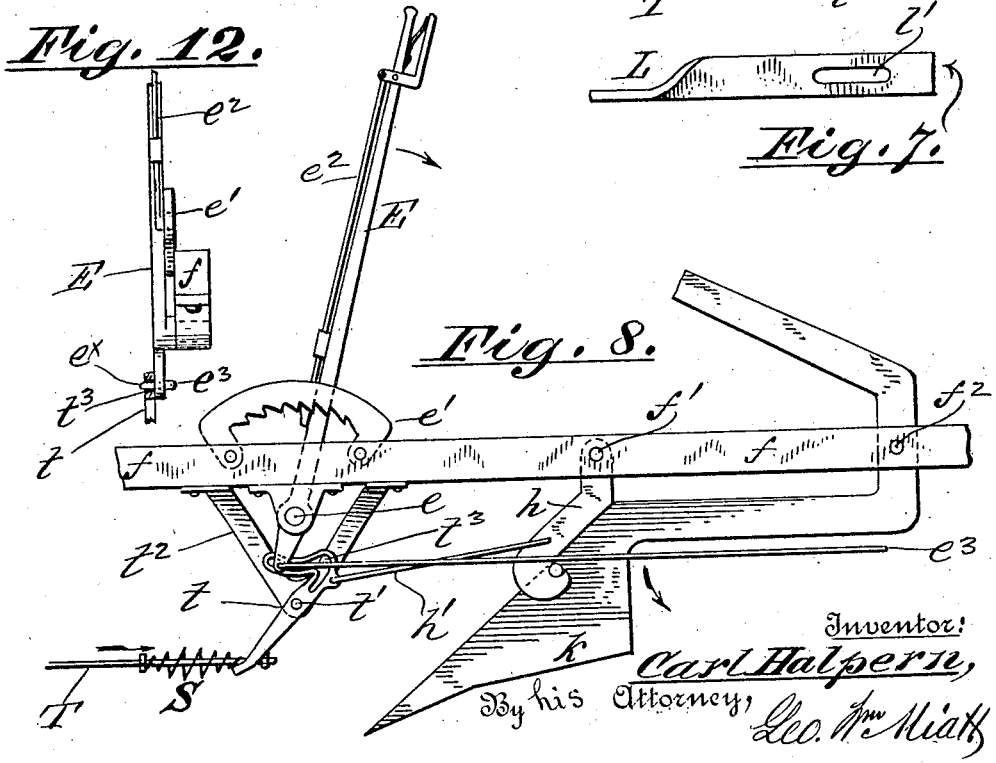

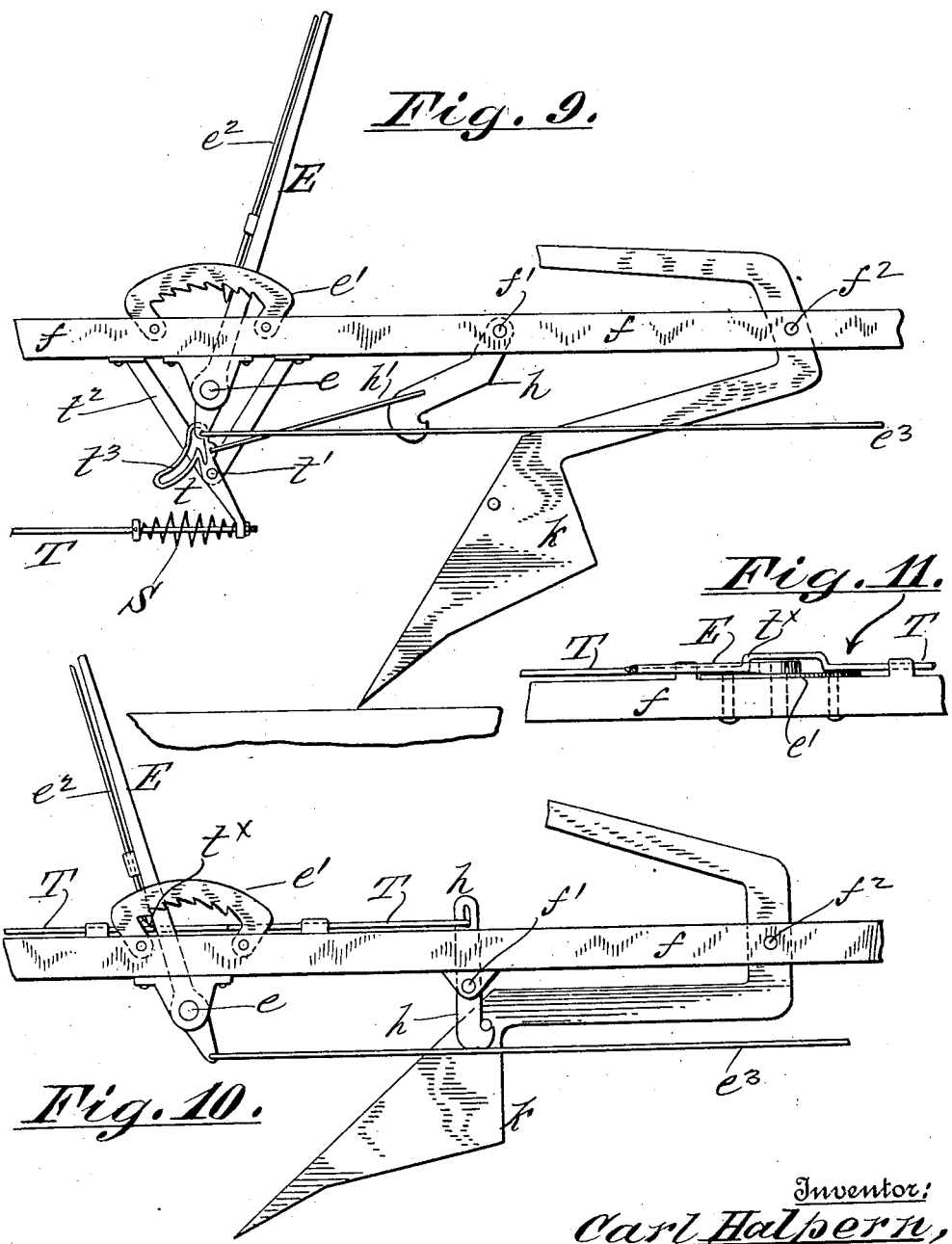

UNITED STATES PATENT OFFICE.

CARL HALPERN, OF NEWARK, NEW JERSEY.

SAFETY APPLIANCE FOR VEHICLES.

1,401,774.    Specification of Letters Patent.    Patented Dec. 27, 1921.

Application filed October 20, 1920. Serial No. 418,322.

*To all whom it may concern:*

Be it known that I, CARL HALPERN, a citizen of the United States, and a resident of Newark, county of Essex, and State of New Jersey, have invented certain new and useful Improvements in Safety Appliances for Vehicles, of which the following is a specification.

While applicable to buffer-equipped vehicles generally my invention is designed more particularly for use in connection with automobiles and other motor driven road vehicles,—my object being primarily to effect the instantaneous and automatic application of the emergency brake in case of frontal contact with an extraneous object; and secondarily, in conjunction with such automatic emergency brake-setting means, to simultaneously and automatically check the momentum of the vehicle by the application of a ground clog or scraper, as hereinafter exemplified,—the invention consisting in the specific combination and arrangement of parts described and claimed, and a distinctive feature being the pivotally connected twin cross levers, whereby the contact bar is rendered equally operative throughout its whole length, as and for the purpose set forth.

In the accompanying drawings,

Fig. 4, is a plan of my contact bar and its supporting means;

Fig. 5, is a front view of the parts shown in Fig. 4;

Fig. 6, is a sectional detail upon an enlarged scale, taken upon plane of line 6—6, Fig. 4;

Fig. 7, is a detail view of one extremity of one of the twin levers;

Fig. 8, is an elevation, upon an enlarged scale, of the rear tripping mechanism, positioned, as in Fig. 1, illustrating normal conditions, in which the emergency brake lever is free to be hand manipulated;

Fig. 9, is a similar view showing the result of the rear thrust of the actuating rod;

Fig. 10, is a view similar to Fig. 8, showing a modification in construction of the rear tripping mechanism;

Fig. 11, is a detail plan of certain parts shown in Fig. 10.

Fig. 12, is a detail view showing the connection between the emergency brake lever and the thrust rod rock lever.

Figure 1:
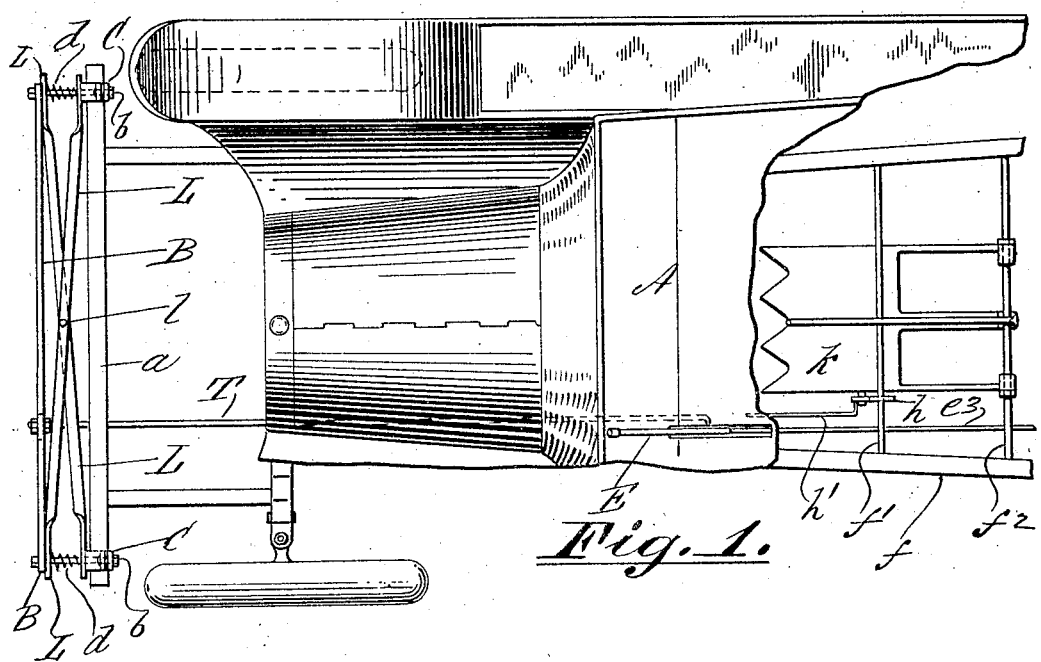
Figure 1, is a top view of the forward part of an automobile partly broken away, showing a practical embodiment of my invention as applied thereto.
Figure 3:
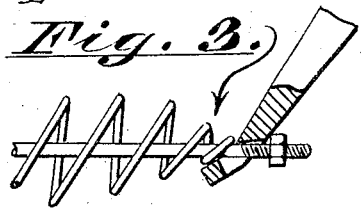
Fig. 3, is a sectional detail showing the connection between the rear end of my actuating rod and tripping lever.

A, represents the body of an auto-car of any desired make or type, on the front of which is positioned my contact or concussion bar B, said bar B, being resiliently mounted so as to be yieldable to frontal pressure or resistance exerted against it. This concussion bar B, may itself constitute the buffer or fender of the machine, or it may be attached to or mounted upon any of the buffers or fenders known in the art, as may be found most expedient. In other words it may supersede the fender as heretofore known or used, or be formed as an attachment thereto, auxiliary in function. In the accompanying drawings I have shown it as mounted on a cross member or fender $a$, supported on the forward axle of the machine, although I do not limit myself thereto, nor to any specific form of support,—the essential feature in this respect being a base, such as $a$, suitable for the maintenance of said concussion bar B, and its elastic resilient mount.

In the construction shown in the drawings the concussion bar B, is rigidly attached to two bracket rods $b$, $b$, positioned one approximately at each end thereof, the rear portions of said bracket rods $b$, $b$, being slidably supported in bearings formed for the purpose in the base member $a$, and in the clamps C, C, which are bolted or otherwise rigidly secured to said base member $a$, as shown more particularly in Fig. 6.

L, L, are twin cross levers fulcrum connected centrally, as at $l$, and having their free outer extremities bifurcated or formed with elongate slots $l'$, $l'$, so as to straddle the aforesaid slidable bracket rods $b$, $b$, the elongate slots $l'$, $l'$, allowing the ends of the twin levers to ride over and upon the bracket rods $b$, $b$. Interposed between the opposed ends of the twin levers L, L, are expansion springs $d$, $d$, which tend constantly to spread the said levers apart with their ends bearing respectively against the rear side of the concussion bar B, and the outer or front sides of the clamps C. These expansion springs $d$, $d$, are preferably of conoidal spiral form and positioned upon and around the bracket rods $b$, $b$, their conoidal form adapting the convolutions to fit within each other when the spring is compressed, so that the twin levers L, L, may be practically closed one upon the other, thereby enabling me to economize space between the concussion bar B, and its base $a$, while affording ample movement of said concussion bar when pressed inward with sufficient force against the resistance of said springs $d$, $d$, it being understood of course that the expansion springs $d$, $d$, under normal conditions, maintain the concussion bar B, in advanced position.

The front end of the actuating thrust rod T, is attached to the concussion bar B, and extends rearward therefrom in substantial alinement with the emergency brake lever E, which is fulcrumed at $e$, and provided with the segmental rack $e'$, spring controlled pawl $e^2$, and connection rod $e^3$, the latter extending to the brake mechanism, etc., in the usual manner. In fact my auxiliary safety appliance, while designed to automatically apply the emergency brake in case of frontal collision or forceful contact with extraneous objects, is not designed to interfere with the normal manipulation thereof by hand in the usual manner. This result may be attained by resort to various mechanical expedients, two of which are shown in the accompanying drawings. Thus in Figs. 2, 3, 8 and 9, I show my actuating thrust rod T, as connected with the lower arm of a bell-crank lever $t$, fulcrumed at $t'$, upon a bracket $t^2$, provided therefor on the under side of the longitudinal member $f$, of the chassis frame,—the upper arm of said bell-crank lever $t$, being formed with a slot $t^3$, normally concentric with the fulcrum $e$, of the emergency lever E, the lower extremity of which is formed with a stud $e^x$, (see Fig. 12) extending into said crescential slot $t^3$. Hence, under normal conditions said stud $e^x$, will travel freely back and forth in said crescential slot $t^3$, so that the manipulation of the emergency brake lever E, is unrestricted under the conditions illustrated in Figs. 2 and 8. If however the bell-crank lever $t$, is rocked by a rearward thrust of the actuating rod T, the rear end wall of the crescentic slot $t^3$, will contact with the stud $e^x$, on the lower end of the emergency lever E, and shift and set the said lever to apply the emergency brake as indicated in Fig. 9, of the drawings, provided of course that the brake has not already been applied manually.

In the alternative or modified arrangement shown in Figs. 10 and 11, the rock lever $t$, is dispensed with, and the actuating thrust rod T, is simply formed with a shoulder $t^x$, which will push back and set the emergency brake lever E, (if not already applied) when the said thrust rod T, is actuated by pressure exerted against the concussion bar B, as hereinbefore set forth.

Figure 2:
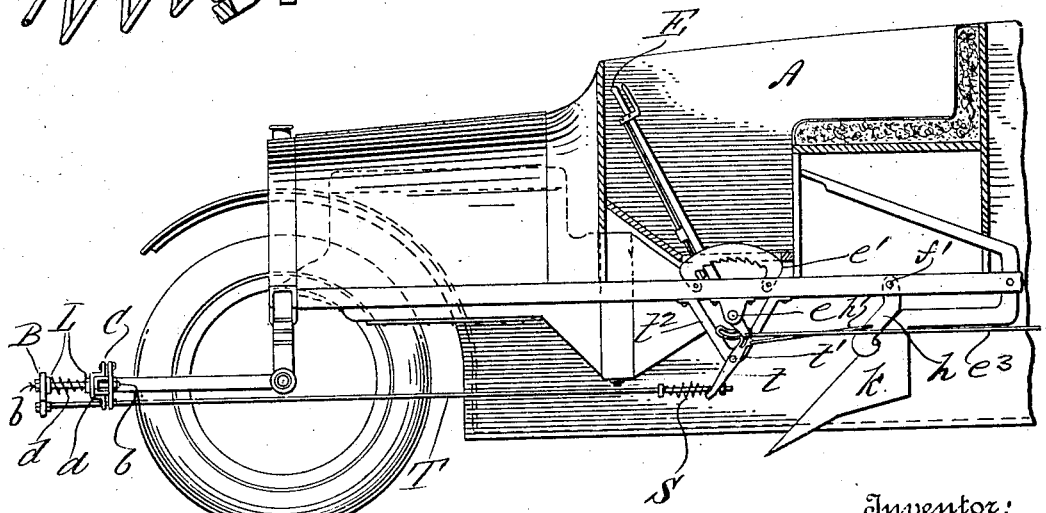
Fig. 2, is a sectional side elevation of the car in part, with my safety appliances set in normal position, as in Fig. 1.

My automatic brake setting mechanism is thus operatively complete, and may be used independently and simply as an adjunctive attachment for super-emergency brake control; or it may be supplemented by my automatic clogging device actuated either directly (as illustrated in Fig. 10) or indirectly (as illustrated in Figs. 2, 8 and 9) by the thrust rod T. Thus in Fig. 10, the said actuating thrust rod T, extends beyond the emergency brake lever E, and connects directly with the latch $h$, which in this case is in the form of a rock lever being fulcrumed at $f'$, to the side frame $f$, whereas in Figs. 2, 8 and 9, said latch $h$, is connected by a link $h'$, with the rock lever $t$. In either case the rearward thrust of the actuating rod T, releases the gravity clog $k$, pivotally connected with the frame $f$, at $f^2$, so that the forward part of said clog $k$, falls to the ground and acts as a deterrent to check the momentum of the car, thus co-acting with the emergency brake in stopping the machine in a relatively short time and space. To this end, the contactual clog or drag $k$, may be pointed as shown in the drawings, or otherwise constructed to dig into the road or increase frictional contact therewith for the purpose set forth.

In order to safe-guard the operative parts against fracture in case of collision and excessive pressure, a safety spring S, is interposed between the thrust rod T, and the emergency lever E, said spring being of sufficient stiffness and strength to set the emergency brake lever upon the rearward thrust of the actuating rod T, as hereinbefore set forth, but thereafter yielding to any super abundance of pressure to allow the concussion bar B, and twin levers to collapse against their basic support $a$.

While I have herein shown and described my yieldable concussion bar as resiliently mounted I do not wish to confine myself to the feature of resilience, which is not indispensable to the operation of the thrust rod as related to the emergency brake lever.

What I claim as my invention and desire to secure by Letters Patent is,

1. A safety appliance for vehicles of the character designated comprising in operative combination, an emergency brake lever normally manipulatable, a yieldably mounted frontal concussion bar, pivotally connected twin cross levers controlling said concussion bar, and an actuating thrust rod interposed between said concussion bar and said emergency brake lever, for the purpose described.

2. A safety appliance for vehicles of the character designated comprising in operative combination, an emergency brake lever normally manipulatable, a yieldably and resiliently mounted frontal concussion bar, pivotally connected twin cross levers controlling said concussion bar, and an actuating thrust rod interposed between said concussion bar and said emergency brake lever, for the purpose described.

3. A safety appliance for vehicles of the character designated comprising in operative combination, an emergency brake lever normally manipulatable, a yieldably mounted frontal concussion bar, pivotally connected twin cross levers controlling said concussion bar, an actuating thrust rod interposed between said concussion bar and said emergency brake lever, and a safety pressure spring interposed between the said thrust rod and the said emergency brake lever, for the purpose described.

4. A safety appliance for vehicles of the character designated comprising in operative combination, an emergency brake lever normally manipulatable, a yieldably mounted frontal concussion bar, pivotally connected twin cross levers controlling said concussion bar, an actuating thrust rod interposed between said concussion bar and said emergency brake, and a ground clogging device releasable by said actuating thrust rod, for the purpose described.

5. A safety appliance of the character designated comprising in operative combination, a yieldably mounted frontal concussion bar, pivotally connected twin cross levers controlling said concussion bar, an emergency brake lever normally manipulatable, a ground clogging device, and an actuating thrust rod interposed between the said concussion bar and the said brake lever and connected with said ground clogging device, for the purpose described.

6. A safety appliance of the character designated comprising in operative combination, a yieldably mounted frontal concussion bar, pivotally connected cross levers controlling said concussion bar, an emergency brake lever normally manipulatable, a ground clogging device, and an actuating thrust rod interposed between said concussion bar and said emergency brake lever and connected with said ground clogging device, for the purpose described.

7. A safety appliance of the character designated comprising in operative combination, a yieldably and resiliently mounted frontal concussion bar, pivotally connected twin cross levers controlling said concussion bar, an emergency brake lever normally manipulatable, a ground clogging device, an actuating thrust rod interposed between the said concussion bar and the said emergency brake lever and connected with said ground clogging device, and a safety pressure spring interposed between the said thrust rod and the said emergency brake and said ground clogging device, for the purpose described.

8. A safety appliance of the character designated comprising in operative combination a frontal concussion bar, centrally pivoted twin cross levers controlling said concussion bar, springs interposed between the opposed ends of said twin cross levers, an emergency brake lever normally manipulatable, and an actuating thrust rod interposed between the said concussion bar and the said emergency brake, for the purpose described.

9. A safety appliance of the character designated comprising in operative combination a frontal concussion bar, centrally pivoted twin cross levers controlling said concussion bar, springs interposed between the opposed ends of said twin cross levers, an emergency brake lever normally manipulatable, an actuating thrust rod interposed between the said concussion bar and the said emergency brake and a safety pressure spring interposed between the said thrust rod and the said emergency brake lever, for the purpose described.

10. A safety appliance of the character designated comprising in operative combination a frontal concussion bar, centrally pivoted twin cross levers controlling said concussion bar, springs interposed between the opposed ends of said twin cross levers, an emergency brake lever normally manipulatable, a ground clogging device, an actuating thrust rod interposed between the said concussion bar and the said emergency brake lever and connected with said ground clogging device, and a safety pressure spring interposed between the said thrust rod and the said emergency brake lever and ground clogging device, for the purpose described.

CARL HALPERN.

Witnesses:
DOROTHY MIATT,
GEO. WM. MIATT.